United States Patent
Iguchi et al.

(10) Patent No.: US 10,344,166 B2
(45) Date of Patent: Jul. 9, 2019

(54) BLACK AZO PIGMENT AND COLORANT

(71) Applicant: DAINICHISEIKA COLOR & CHEMICALS MFG. CO., LTD., Tokyo (JP)

(72) Inventors: Kazuki Iguchi, Tokyo (JP); Naomi Oguma, Tokyo (JP); Shuwa Ozako, Tokyo (JP)

(73) Assignee: DAINICHISEIKA COLOR & CHEMICALS MFG. CO., LTD., Tokyo (JP)

( * ) Notice: Subject to any disclaimer, the term of this patent is extended or adjusted under 35 U.S.C. 154(b) by 0 days.

(21) Appl. No.: 16/073,631

(22) PCT Filed: Apr. 14, 2017

(86) PCT No.: PCT/JP2017/015301
§ 371 (c)(1),
(2) Date: Jul. 27, 2018

(87) PCT Pub. No.: WO2017/183577
PCT Pub. Date: Oct. 26, 2017

(65) Prior Publication Data
US 2019/0048195 A1 Feb. 14, 2019

(30) Foreign Application Priority Data

Apr. 22, 2016 (JP) .................. 2016-086510

(51) Int. Cl.
*G02B 5/20* (2006.01)
*C09B 56/02* (2006.01)
*C09B 67/42* (2006.01)

(52) U.S. Cl.
CPC .............. *C09B 56/02* (2013.01); *G02B 5/20* (2013.01); *G02B 5/208* (2013.01); *C09B 67/0092* (2013.01)

(58) Field of Classification Search
CPC ....... C09B 56/02; C09B 67/0092; G02B 5/20; G02B 5/208
USPC ...................................................... 106/496
See application file for complete search history.

(56) References Cited

U.S. PATENT DOCUMENTS

| 5,484,901 A | 1/1996 | Krapp et al. |
| 6,623,556 B2 * | 9/2003 | Zama .................. C09B 29/0011 106/496 |
| 9,822,266 B2 | 11/2017 | Okamoto et al. |

FOREIGN PATENT DOCUMENTS

| JP | 07-258565 | 10/1995 |
| JP | 2015-110691 | 6/2015 |
| WO | 2012/169506 | 12/2012 |
| WO | 2015/125224 | 8/2015 |

OTHER PUBLICATIONS

International Search Report, issued in the corresponding PCT application No. PCT/JP2017/015301, dated Jul. 11, 2017, 5 pages.
Pham et al., "A one-pot synthesis of isoindolin-1-imine derivatives", Tetrahedron, vol. 69, issue 51, Dec. 23, 2013, pp. 10933-10939.

* cited by examiner

*Primary Examiner* — Anthony J Green
(74) *Attorney, Agent, or Firm* — Hamre, Schumann, Mueller & Larson, P.C.

(57) ABSTRACT

There are provided: a near-infrared non-absorbing black azo pigment having a sufficient blackness, having an excellent durability such as solvent resistance, and having a novel skeleton; and a colorant that uses the black azo pigment and is useful for forming a black matrix or a light-shielding film. The black azo pigment is represented by the following formula (1), wherein $R_1$ represents an aryl group optionally having a substituent. In addition, the colorant contains the black azo pigment and is suitable as a material or the like for forming a black matrix for a color filter or for forming a light-shielding film.

7 Claims, 1 Drawing Sheet

(1)

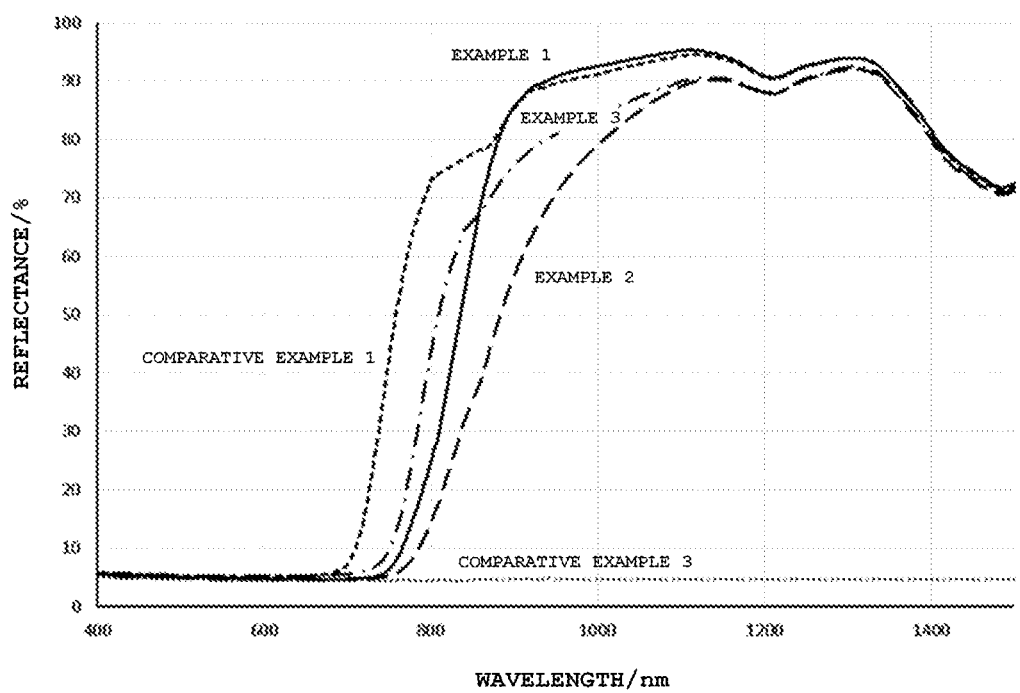

BLACK AZO PIGMENT AND COLORANT

TECHNICAL FIELD

The present invention relates to a near-infrared non-absorbing black azo pigment, and a colorant using the same.

BACKGROUND ART

Up to now, carbon black-based pigments and iron oxide-based pigments have been general as black pigments that are used as colorants for paints, printing inks, and plastics. These black pigments exhibit a black color by absorbing all the rays of light including visible light region of sunlight.

The black pigments (carbon black-based pigments in particular) absorb light in a visible light region (about 380 to about 780 nm) to exhibit a black color, but in fact, also absorbs light that is in a near-infrared region including a wavelength region of 800 to 1,400 nm and that greatly contributes to heat. Therefore, there has been a problem that the temperature of articles colored by the black pigments as described above rise easily by being irradiated with sunlight. In addition, as articles colored by a black pigment, sophisticated products such as a black matrix for a color filter have appeared in recent years. Thus, various studies have been made on a black pigment that does not cause temperature rise even if it is irradiated with sunlight, a colorant (coloring composition) for use in coloring an article into black, and the like.

For example, there is proposed an azomethine group-containing black azo pigment that does not absorb light in the infrared region (infrared radiation) while exhibiting a black color by absorbing light in the visible region (Patent Literature 1). Patent Literature 1 discloses that an article the temperature of which does not rise excessively due to direct sunlight or the like can be obtained by using a colorant containing this black azo pigment.

In addition, there is proposed an azo pigment obtained by using, as a diazo component, a compound represented by the following formula (A) (Patent Literature 2).

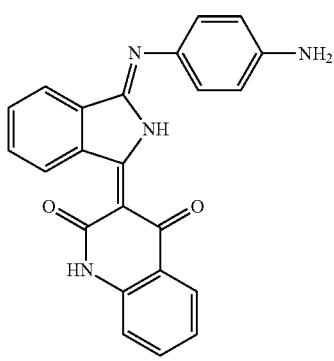

(A)

CITATION LIST

Patent Literature

Patent Literature 1: Japanese Patent Laid-Open No. 2015-110691
Patent Literature 2: Japanese Patent Laid-Open No. 7-258565

SUMMARY OF INVENTION

Technical Problem

However, there have been problems that many of general azo pigments are inferior in durability such as heat resistance and solvent resistance and are liable to be insufficient in blackness. For example, the black azo pigment which is proposed in Patent Literature 1 is insufficient in solvent resistance and therefore has been unsuitable for the applications for which the solvent resistance is required. Further, the blackness is also insufficient, and there is room for improvement. In addition, Patent Literature 2 does not disclose a black pigment, but specifically discloses only yellow, orange, red-orange, red, dark red, brown, blackish brown, purple-black, and dark green pigments.

The present invention has been completed in consideration of the problems of the conventional techniques, and an object of the present invention is to provide a near-infrared non-absorbing black azo pigment having a sufficient blackness, having an excellent durability such as solvent resistance, and having a novel skeleton. In addition, another object of the present invention is to provide a colorant using the above-described black azo pigment.

Solution to Problem

That is, according to the present invention, a black azo pigment as shown below is provided.

[1] A black azo pigment represented by the following formula (1).

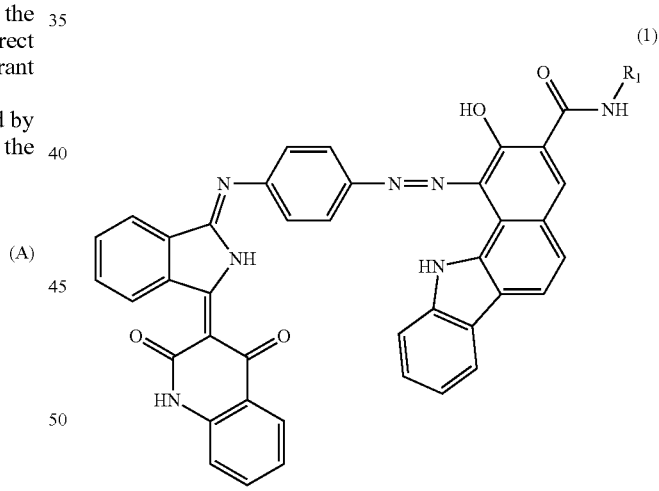

(1)

wherein $R_1$ represents an aryl group optionally having a substituent.

[2] The black azo pigment according to [1], wherein $R_1$ in the formula (1) is represented by the following formula (2-X), (2-Y), or (2-Z).

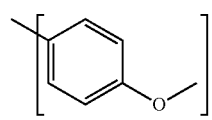

(2-X)

-continued

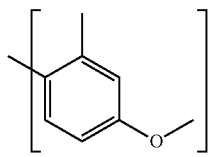
(2-Y)

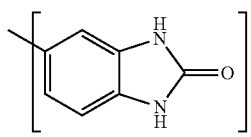
(2-Z)

[3] The black azo pigment according to [1] or [2], having a blackness value of 2.2 or more in terms of an optical density (OD value) in an alkyd/melamine baking paint.

[4] The black azo pigment according to any one of [1] to [3], being a powder or a particle having a volume average particle diameter of 20 to 1,000 nm.

Further, according to the present invention, a pigment colorant described below is provided.

[5] A colorant containing the black azo pigment according to any one of [1] to [4].

[6] The colorant according to [5], to be used for forming a black matrix for a color filter or for forming a light-shielding film.

Advantageous Effects of Invention

According to the present invention, a near-infrared non-absorbing black azo pigment having a sufficient blackness, having an excellent durability such as solvent resistance, and having a novel skeleton can be provided. In addition, according to the present invention, a colorant using this black azo pigment can be provided.

BRIEF DESCRIPTION OF DRAWINGS

FIG. 1 shows visible-infrared absorption spectra of coating films each formed using a pigment in each of Examples and Comparative Examples.

DESCRIPTION OF EMBODIMENTS

<Black Azo Pigment>

Hereinafter, embodiments according to the present invention will be described, but the present invention is not limited to the following embodiments. A black azo pigment according to the present invention has a structure represented by the following formula (1). Hereinafter, the details will be described.

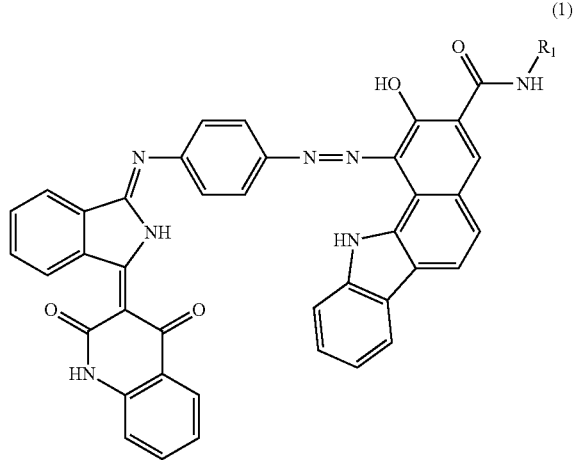
(1)

wherein $R_1$ represents an aryl group optionally having a substituent.

Examples of the aryl group represented by $R_1$ in formula (1) include a phenyl group, a hetero aryl group, and a naphthyl group. Among them, a phenyl group is preferable. In addition, examples of the substituent that can be bound to the aryl group include an alkyl group, an alkenyl group, an alkynyl group, an alkoxy group each having 1 to 4 carbon atoms, an amino group, and a carbamate group. It is preferable that $R_1$ in formula (1) be a group represented by the following formula (2-X), (2-Y), or (2-Z).

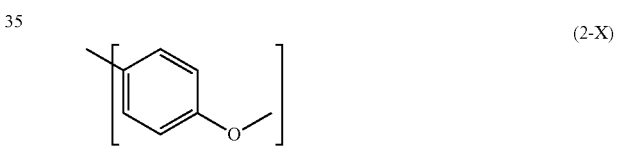
(2-X)

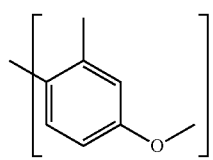
(2-Y)

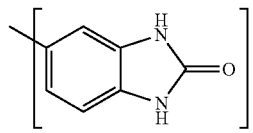
(2-Z)

One of the important characteristics of the black azo pigment according to the present invention is that it is a pigment synthesized by using, as a diazo component (component that can form diazonium compound), the compound represented by the following formula (A). The property of the compound represented by the following formula (A) is greatly different from that of the diazo component (B) represented by the following formula (B) described in Patent Literature 1.

(A)

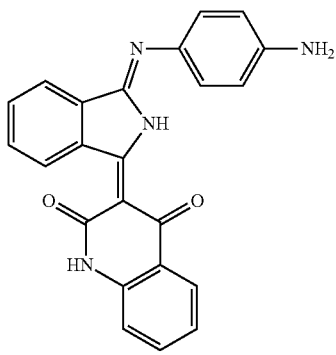

(B)

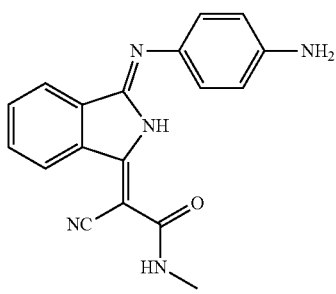

Firstly, the black azo pigment according to the present invention that can be produced by using the diazo component represented by formula (A) has a more improved durability such as solvent resistance than the black azo pigments each produced by using the diazo component represented by formula (B). It is considered that this is because the diazo component represented by formula (A) has a quinoline moiety in the structure thereof and therefore intermolecular forces such as hydrogen bonding and π-π interaction is increased.

Secondly, the black azo pigment according to the present invention exhibits an improved blackness because the absorption wavelength region is expanded. The absorption in a wavelength region of 650 to 700 nm is weak in conventional black azo pigments, and therefore the conventional black azo pigments have been insufficient in blackness. In contrast, the resonance is expanded in the diazo component represented by formula (A) because the diazo component has a quinoline moiety in the structure thereof. Accordingly, it is considered that the absorption wavelength is covered up to a long wavelength region in visible light for the black azo pigment according to the present invention that can be produced by using the diazo component represented by formula (A).

A diffusion coefficient equivalent particle diameter (volume average particle diameter, distribution standard: light intensity) measured by a dynamic light scattering method is 20 to 1,000 nm for the black pigment. When the diffusion coefficient equivalent particle diameter is in this range, the black azo pigment can be used as a black pigment in various applications without a problem. It may be physically difficult to obtain a black pigment having a volume average particle diameter of less than 20 nm in some cases. On the other hand, when the volume average particle diameter exceeds 1,000 nm, the coloring power maybe insufficient in some cases where the black azo pigment is used as a colorant. To further enhance the blackness and the near-infrared non-absorbing property, the black azo pigment preferably has a volume average particle diameter of 20 to 300 nm. To still further enhance the blackness (OD value: 2.2 or more), the black azo pigment more preferably has a volume average particle diameter of 20 to 100 nm.

The black azo pigment according to the present invention has an extremely high blackness even though it has a near-infrared non-absorbing property. Specifically, the black azo pigment according to the present invention preferably has an optical density (OD value) of 2.2 or more, and more preferably has a blackness value of 2.5 or more in an alkyd/melamine baking paint.

(Method for Producing Black Azo Pigment)

The black azo pigment according to the present invention can be produced, for example, by subjecting a diazonium compound (diazonium salt), which is obtained by diazotizing a compound represented by the following formula (A), and a compound represented by the following formula (C) to a coupling reaction.

(A)

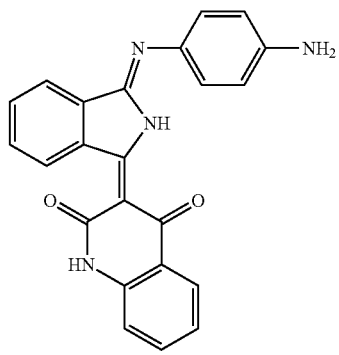

(C)

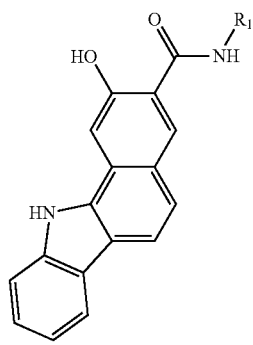

wherein $R_1$ represents an aryl group optionally having a substituent.

$R_1$ in formula (C) is the same as $R_1$ in the formula (1) including those preferable. Incidentally, the compound of formula (C) in which $R_1$ is represented by formula (2-X) is a compound publicly known as Color Index (C.I.) Coupling Component 13. In addition, the compound of formula (C) in which $R_1$ is represented by formula (2-Y) is a compound publicly known as C.I. Coupling Component 25. Both the compounds are easily available and are advantageous in terms of cost.

Moreover, the use of the compound of formula (C) in which $R_1$ is represented by formula (2-Z) can make the black azo pigment more excellent in durability such as solvent resistance. Among others, the compound of formula (C) in which $R_1$ is represented by formula (2-Y) is preferably used because the balance between the cost and the durability is excellent.

The compound represented by formula (A) can be produced, for example, in the following manner. Firstly, as shown in the following reaction formula, diiminoisoindoline and 2,4-dihydoxyquinoline are reacted in boiling methanol to obtain an intermediate (D) represented by the following formula (D).

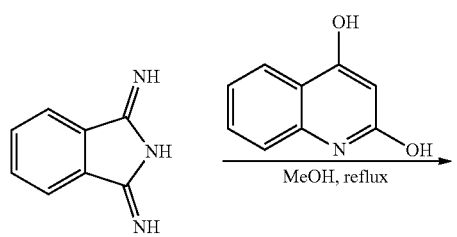

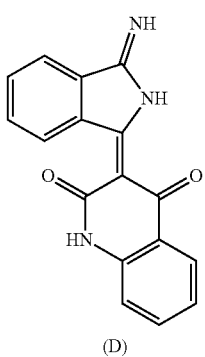

(D)

Subsequently, as shown in the following reaction formula, the obtained intermediate (D) and para-phenylenediamine are reacted in boiling methanol, and thus the compound represented by the following formula (A) (diazo component (A)) can be obtained. Incidentally, an acid catalyst is preferably used because the reaction between the intermediate (D) and para-phenylenediamine progresses smoothly.

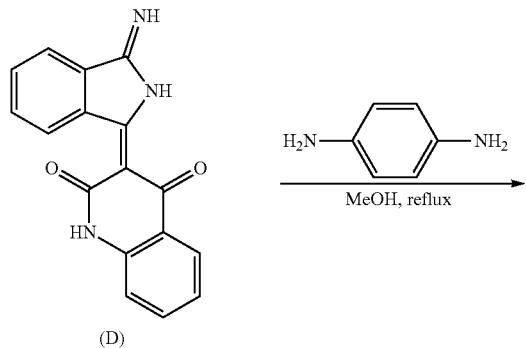

(D)

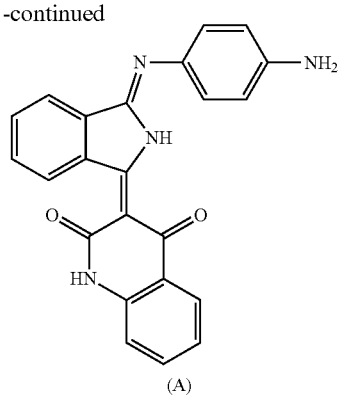

(A)

The diazotization reaction of the compound represented by formula (A) and the coupling reaction between the obtained diazonium compound and the compound represented by formula (C) are preferably performed in water and an organic solvent. Examples of the organic solvent include: alcohols such as methanol and ethanol; aromatic solvents such as toluene, xylene, o-dichlorobenzene, nitrobenzene, and o-nitrotoluene; and polar solvents such as N,N-dimethylformamide, N,N-dimethylacetamide, and N-methylpyrrolidone. These organic solvents can be used singly, or two or more thereof can be used in combination.

<Colorant>

A colorant (coloring composition) according to the present invention contains the above-described black azo pigment. The use of the colorant according to the present invention can color an article and the like into a black color with a high degree of blackness. In addition, the blackness can be enhanced more than in the case where carbon black is used although it depends on the concentration. The colorant according to the present invention may contain an additional pigment component other than the black azo pigment. Examples of the additional pigment component include chromatic color pigments, white pigments, other black pigments, and extender pigments. In addition, two or more additional pigment components may be used together to match the intended hue. The colorant according to the present invention is useful, for example, as a material for forming a black matrix for a color filter or for forming a light-shielding film.

The colorant according to the present invention can be prepared, for example, by allowing the black azo pigment to be contained in a liquid dispersion medium or a solid dispersion medium. That is, the colorant according to the present invention may be prepared as a coloring composition in the form of liquid, the coloring composition containing a pigment component that contains the black azo pigment in (i) a liquid dispersion medium or as a coloring composition in the form of solid containing a pigment component that contains the black azo pigment in (ii) a solid dispersion medium, according to the purpose, the application, the use method, and the like.

The coloring composition in the form of liquid is mainly used as a colorant to be applied on the surface of an article, to impregnate an article therewith, or to be drawn/printed on the surface of an article. That is, the coloring composition in the form of liquid can be used for various applications such as, for example, a paint, a colorant for plastics, a colorant for fiber, a printing ink, stationery, a colorant for image recording, or a colorant for image display.

As the liquid dispersion medium, a liquid per se or a liquid containing a solvent or water can be used. In addition, the liquid dispersion medium may contain at least one film-forming material selected from the group consisting of polymerized products each optionally having a reactive group, oligomers each optionally having a reactive group, and monomers each optionally having a reactive group. Further, a processed article of a high-concentration pigment, the processed article being obtained by finely dispersing, in a dispersion medium, a high concentration of a pigment component that contains the black azo pigment, is preferably prepared in advance because colorants for various applications can be produced easily. Such a processed article of a high-concentration pigment (high-concentration pigment dispersion liquid) is generally used as a "base color" or a "base ink".

In addition, the coloring composition in the form of solid is mainly utilized as a colorant for coloring plastic products or synthetic fiber. Specifically, the coloring composition in the form of solid is used in a publicly known product shape such as a master powder or a master batch being a processed article of a high-concentration pigment (high-concentration pigment dispersion), the processed article being obtained by finely dispersing, in a solid dispersion medium, a high concentration of a pigment component that contains the black azo pigment, or a colored pellet that is wholly colored. As the solid dispersion medium, a thermosetting resin, a heat-curing resin, a wax, a fatty acid amide, and metallic soap of a fatty acid can be used. These solid dispersion media can be used singly, or two or more thereof can be used in combination.

EXAMPLES

Hereinafter, the present invention will be described specifically based on Examples, but the present invention is not limited to these Examples. It is to be noted that "parts" and "%" in Examples and Comparative Examples are each on a mass basis unless otherwise noticed Production of Diazo Component (A)

Synthesis Example 1 Production of Intermediate (D)

To 75 parts of methanol, 22 parts of 1,3-diiminoisoindoline and 12 parts of 2,4-dihidroxyquinoline were added to be heated at 55 to 60° C. for 3 hours, followed by hot filtration, washing with methanol and water. The resultant product was dried at 80° C., and thus 14 parts of an intermediate (D) represented by the following formula (D) was obtained.

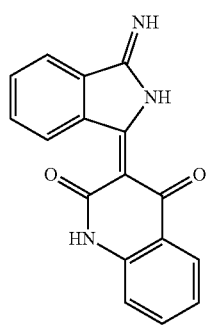

(D)

Synthesis Example 2 Production of Diazo Component (A)

To 300 parts of methanol, 10 parts of the intermediate (D), 7 parts of para-toluenesulfonic acid monohydrate, and 4 parts of para-phenylenediamine were added to be heated at 55 to 60° C. for 5 hours. The resultant product was subjected to hot filtration, and was then washed with methanol and water. The resultant product was dried at 80° C., and thus 11 parts of a diazo component (A) represented by the following formula (A) was obtained.

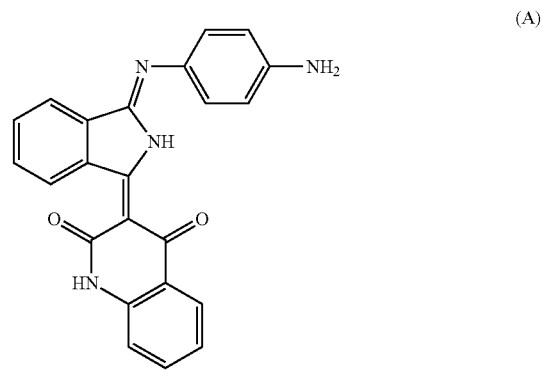 [SMILES: Nc1ccc(/N=C2\N/C(=C3/C(=O)Nc4ccccc4C3=O)c3ccccc32)cc1]

(A)

Production of Black Azo Pigment

Example 1 Production of Black Azo Pigment (E)

In 60 parts of dimethylacetamide, 4 parts of the compound represented by formula (A) (diazo component (A)) was dissolved. After a hydrochloride was prepared by adding concentrated hydrochloric acid to the resultant solution according to an ordinary method, diazotization was performed by adding an excessive amount of an aqueous sodium nitrite solution thereto to prepare a diazonium salt solution. On the other hand, a solution containing a coupling component was prepared by dissolving 4 parts of a compound represented by the following formula (F) in 0.6 parts of sodium hydroxide and 400 parts of methanol. The solution containing the coupling component was gradually added to the diazonium salt solution the temperature of which was kept at 15° C. or lower. Sodium acetate was added thereto to adjust the pH to 6.5 to 7.0, followed by stirring for 1 hour, and further followed by stirring for 2 hours at 25° C. Subsequently, the temperature was raised to 40° C., followed by stirring for 3 hours, and thus the coupling reaction was completed to generate a pigment. The generated pigment was subjected to filtration and was then washed with methanol. The generated pigment was further washed with water and dried to obtain 6 parts of a black azo pigment (E) represented by the following formula (E). The volume average particle diameter of the black azo pigment (E), measured using a particle size measurement instrument (trade name "NICOMP 380ZLS-S, manufactured by Particle Sizing Systems, LLC.), was about 90 nm.

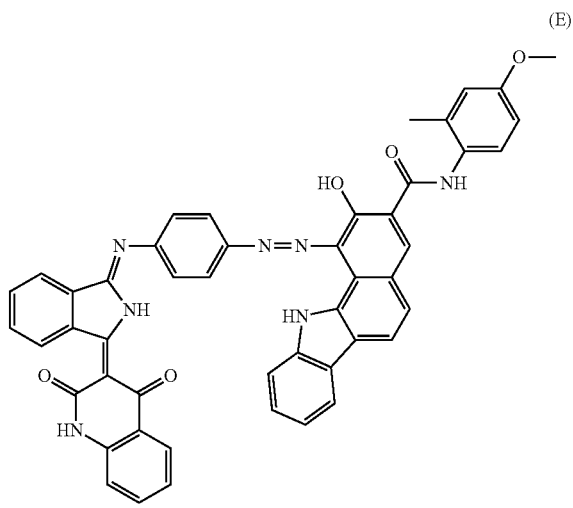

(E)

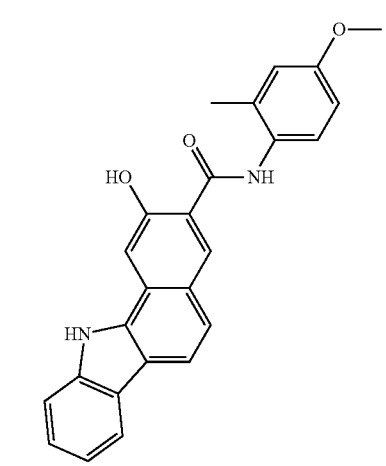

(F)

Example 2 Production of Black Azo Pigment (G)

A black azo pigment (G) represented by the following formula (G) in an amount of 7 parts was obtained in the same manner as in the previously described Example 1 except that 4 parts of a compound represented by the following formula (H) was used in place of 4 parts of the compound represented by formula (F). The volume average particle diameter of the obtained black azo pigment (G) was about 80 nm.

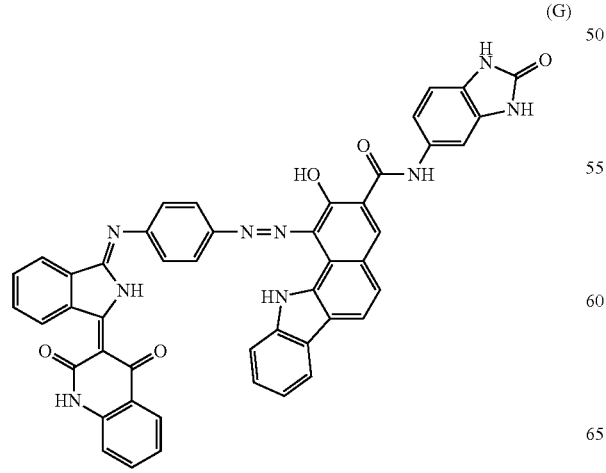

(G)

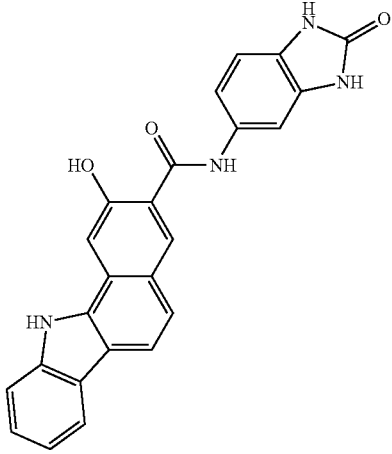

(H)

Example 3 Production of Black Azo Pigment (I)

A black azo pigment (I) represented by the following formula (I) in an amount of 6 parts was obtained in the same manner as in the previously described Example 1 except that 4 parts of a compound represented by the following formula (J) was used in place of 4 parts of the compound represented by formula (F). The volume average particle diameter of the obtained black azo pigment (I) was about 90 nm.

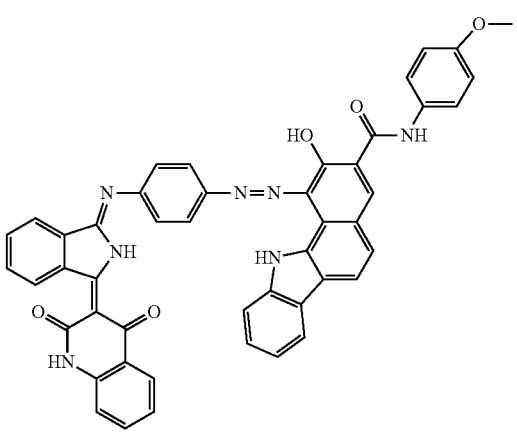

(I)

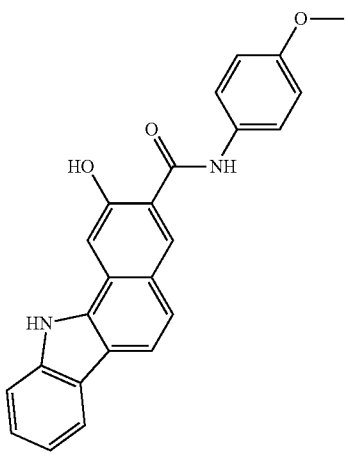

(J)

Comparative Example 1 Production of Black Azo Pigment (K)

A black azo pigment (K) represented by the following formula (K) was produced according to the method described in Patent Literature 1.

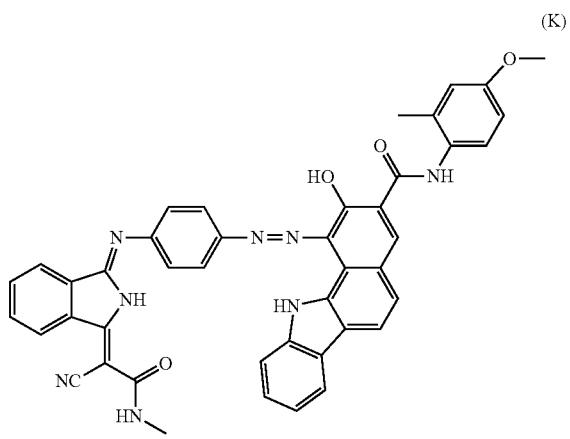 [SMILES: CNC(=O)/C(C#N)=C1\N/C(=N\c2ccc(N=Nc3c(O)c(C(=O)Nc4ccc(OC)cc4C)cc4ccc5c6ccccc6[nH]c5c34)cc2)c2ccccc21]

(K)

Comparative Example 2 Production of Azo Pigment (L)

An azo pigment (L) represented by the following formula (L) was produced according to the method described in Patent Literature 2.

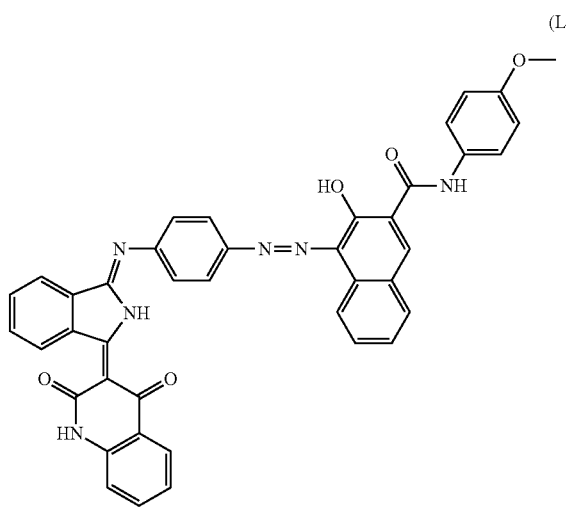 [SMILES: COc1ccc(NC(=O)c2cc3ccccc3c(N=Nc3ccc(/N=C4\N/C(=C5/C(=O)Nc6ccccc6C5=O)c5ccccc54)cc3)c2O)cc1]

(L)

<Evaluation>
(Paint Test)

Paints were each prepared by blending respective components according to the combination shown below and dispersing the resultant mixture for 90 minutes using a paint conditioner. Incidentally, carbon black (trade name "#45B", manufactured by Mitsubishi Chemical Corporation) was used as a pigment of Comparative Example 3 to prepare a paint in the same manner. Each of the prepared paints was applied on white paper using an applicator (3-mill) and was then baked at 140° C. for 30 minutes, thereby forming a coating film having a thickness of about 20 μm, and thus white paper with a coating film was obtained.

| | |
|---|---|
| Pigment | 1.5 parts |
| "Super Beckamine J-820", trade name (*1) | 8.5 parts |
| "Phthalkyd 133 to 60, trade name (*2) | 17.0 parts |
| Xylene/1-butanol (mass ratio of 2/1) mixed solvent | 5.0 parts |

(*1) Butylated melamine resin (manufactured by DIC Corporation)
(*2) Short oil length alkyd resin of palm oil (manufactured by Hitachi Chemical Company, Ltd.)

(Blackness)

The reflectance of each coating film formed on the white paper was measured to calculate the optical density (OD value). The blackness was evaluated according to the following criteria. Evaluation results are shown in Table 1.

Good: blackness is very high (OD value: 2.5 or more)
Fair: blackness is high (OD value: 2.2 or more and less than 2.5)
Poor: blackness is low (OD value: less than 2.2)
(Solvent Resistance)

Each pigment in an amount of 1 part was added to 10 parts of nitrobenzene to be boiled. Whether bleeding occurred or not was visually observed to evaluate the solvent resistance according to the following criteria. Evaluation results are shown in Table 1.

Good: bleeding hardly occurs
Fair: bleeding occurs remarkably
Poor: pigment is almost dissolved

TABLE 1

| | Pigment | Color | Blackness | Solvent resistance |
|---|---|---|---|---|
| Example 1 | E | Black | Good | Good |
| Example 2 | G | Black | Good | Good |
| Example 3 | I | Black | Good | Good |
| Comparative Example 1 | K | Black | Fair | Fair |
| Comparative Example 2 | L | Dark brown | Poor | Poor |
| Comparative Example 3 | Carbon black | Black | Fair | Good |

(Measurement of Visible-Infrared Absorption Spectrum)

Visible-infrared absorption spectrum of each coating film formed on the white paper using the pigment of each of Examples 1 to 3 and Comparative Examples 1 and 3 was measured using a spectrophotometer (trade name "U-4100", manufactured by Hitachi High-Technologies Corporation). The measured spectra are shown in FIG. 1. As shown in FIG. 1, it is found that the reflectance (%) of the coating film formed using the pigment of Comparative Example 1 increases from a wavelength region of about 700 nm or longer. In contrast, it is found that in any of the coating films formed using the pigments of Examples 1 to 3, the reflectance is flat (reflectance is low) in a wavelength region of about 750 nm or shorter, and the reflectance (%) increases from a wavelength region exceeding about 750 nm. As can be seen from the above results, it is clear that the pigments of Examples 1 to 3 exhibit a higher blackness than the pigment of Comparative Example 1.

INDUSTRIAL APPLICABILITY

The black azo pigment according to the present invention is useful as a material for producing a product and the like for which a high blackness is required, such as a black matrix for a CF. In addition, the black azo pigment according to the present invention is a near-infrared non-absorbing pigment and therefore is also useful as a black pigment that does not absorb heat rays, for which carbon black and the like are not suitable.

The invention claimed is:

1. A black azo pigment represented by the following formula (1):

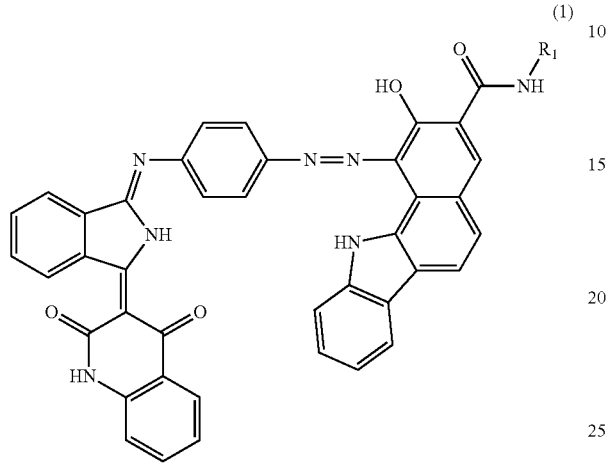

(1)

wherein $R_1$ represents an aryl group optionally having a substituent.

2. The black azo pigment according to claim 1, wherein $R_1$ in the formula (1) is represented by the following formula (2-X), (2-Y), or (2-Z):

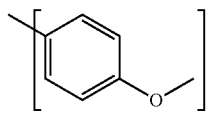

(2-X)

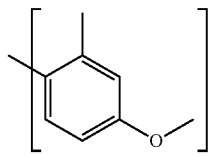

(2-Y)

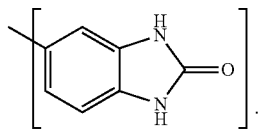

(2-Z)

3. The black azo pigment according to claim 1, having a blackness value of 2.2 or more in terms of an optical density (OD value) in an alkyd/melamine baking paint.

4. The black azo pigment according to claim 1, being a powder or a particle having a volume average particle diameter of 20 to 1,000 nm.

5. A colorant comprising the black azo pigment according to claim 1.

6. A black matrix for a color filter comprising the colorant according to claim 5.

7. A light-shielding film comprising the colorant according to claim 5.

* * * * *